(12) United States Patent
Rau et al.

(10) Patent No.: US 11,388,002 B2
(45) Date of Patent: Jul. 12, 2022

(54) SIDE-CHANNEL HARDENED OPERATION

(71) Applicant: Infineon Technologies AG, Neubiberg (DE)

(72) Inventors: Markus Rau, Gessertshausen (DE); Stefan Heiss, Bobingen (DE)

(73) Assignee: Infineon Technologies AG, Neubiberg (DE)

( * ) Notice: Subject to any disclaimer, the term of this patent is extended or adjusted under 35 U.S.C. 154(b) by 582 days.

(21) Appl. No.: 16/363,149

(22) Filed: Mar. 25, 2019

(65) Prior Publication Data

US 2019/0296908 A1 Sep. 26, 2019

(30) Foreign Application Priority Data

Mar. 26, 2018 (DE) .......................... 102018107114.0

(51) Int. Cl.
*H04L 9/14* (2006.01)
*H04L 9/00* (2022.01)

(52) U.S. Cl.
CPC ................ *H04L 9/14* (2013.01); *H04L 9/002* (2013.01); *H04L 2209/046* (2013.01); *H04L 2209/08* (2013.01)

(58) Field of Classification Search
CPC . H04L 9/14; H04L 9/002; H04L 9/003; H04L 2209/08; H04L 2209/04; H04L 2209/046; G06F 21/755; G06F 21/556
See application file for complete search history.

(56) References Cited

U.S. PATENT DOCUMENTS

| | | | | |
|---|---|---|---|---|
| 6,295,606 B1* | 9/2001 | Messerges | ............ | H04L 9/0625 380/1 |
| 7,907,722 B2* | 3/2011 | Timmermans | .......... | H04L 9/003 713/188 |
| 8,422,668 B1* | 4/2013 | Thichina | .................. | G06F 7/76 714/755 |
| 9,544,131 B2* | 1/2017 | Karroumi | ................. | G06F 7/72 |
| 10,050,776 B2* | 8/2018 | Melzani | .................. | G06F 7/588 |
| 10,050,778 B2* | 8/2018 | Kounavis | ............ | G06F 9/30007 |
| 10,439,796 B2* | 10/2019 | Wurcker | .................. | G09C 1/00 |
| 10,871,947 B2* | 12/2020 | Hutter | ..................... | G06F 7/588 |
| 2005/0283714 A1* | 12/2005 | Korkishko | .............. | G06F 7/724 714/781 |
| 2006/0159257 A1* | 7/2006 | Fischer | .................. | H04L 9/003 380/28 |
| 2006/0256963 A1* | 11/2006 | Gebotys | ................. | H04L 9/003 380/205 |
| 2007/0101424 A1* | 5/2007 | Ravi | ................... | G06F 13/4031 713/188 |
| 2007/0188355 A1* | 8/2007 | Baek | ...................... | H04L 9/003 341/51 |
| 2008/0205169 A1* | 8/2008 | Kuenemund | ............ | G11C 8/20 326/8 |

(Continued)

*Primary Examiner* — David Garcia Cervetti
(74) *Attorney, Agent, or Firm* — Murphy, Bilak & Homiller, PLLC

(57) ABSTRACT

A method is provided for conducting an operation, the method including: determining a first result based on combining a first input with a first mask; determining a second result based on combining a second input with a second mask, the first mask and the second mask fulfilling a precondition; and conducting the operation based on the first result and the second result. A corresponding device is also provided.

17 Claims, 5 Drawing Sheets

Input: $m_{10}, m_{11}, m_{12} \in [0; 2^n[$, so that $m_{10} \oplus m_{11} \oplus m_{12} \in \{0; 2^n - 1\}$ Input: $m_{20}, m_{21}, m_{22} \in [0; 2^n[$, so that $m_{20} \oplus m_{21} \oplus m_{22} \in \{0; 2^n - 1\}$ Input: $in_1 \in [0; 2^n[$ Input: $in_2 \in [0; 2^n[$ Output: $out \in [0; 2^n[$ $out = (m_{10} \wedge in_1) \oplus (m_{11} \wedge in_1) \oplus (m_{12} \wedge in_1)$ $out = (m_{20} \wedge in_2) \oplus (m_{21} \wedge in_2) \oplus (m_{22} \wedge in_2) \oplus out$ return $out$

(56) References Cited

U.S. PATENT DOCUMENTS

| | | | |
|---|---|---|---|
| 2008/0260145 A1* | 10/2008 | Trichina | H04L 9/003 380/46 |
| 2009/0034724 A1* | 2/2009 | Liardet | H04L 9/003 380/252 |
| 2009/0262595 A1* | 10/2009 | Kuenemund | G11C 7/1006 365/230.01 |
| 2009/0323389 A1* | 12/2009 | Kuenemund | G11C 17/12 365/189.011 |
| 2010/0017622 A1* | 1/2010 | Grinchuk | H04L 9/0662 713/189 |
| 2010/0228939 A1* | 9/2010 | Lee | G06F 9/30036 711/E12.001 |
| 2010/0329446 A1* | 12/2010 | Degrendel | G06F 21/755 380/28 |
| 2012/0093308 A1 | 4/2012 | Choi | |
| 2012/0163585 A1 | 6/2012 | Choi et al. | |
| 2012/0250854 A1* | 10/2012 | Danger | H04L 9/003 380/28 |
| 2014/0095883 A1* | 4/2014 | Kirillov | H04L 9/0891 713/176 |
| 2014/0169553 A1 | 6/2014 | Chen et al. | |
| 2014/0254792 A1 | 9/2014 | Gammel et al. | |
| 2015/0169904 A1 | 6/2015 | Leiserson et al. | |
| 2015/0172042 A1* | 6/2015 | Karroumi | H04L 9/0625 380/28 |
| 2015/0244524 A1* | 8/2015 | Pulkus | H04L 9/3006 380/28 |
| 2015/0278555 A1* | 10/2015 | Melzani | H04L 9/002 713/192 |
| 2015/0312027 A1* | 10/2015 | Kim | H04L 9/002 380/28 |
| 2017/0063523 A1* | 3/2017 | Bruneau | G09C 1/00 |
| 2017/0063524 A1* | 3/2017 | Bruneau | H04L 9/005 |
| 2017/0373838 A1* | 12/2017 | Wurcker | G09C 1/00 |
| 2018/0062828 A1* | 3/2018 | Cioranesco | H04L 9/14 |
| 2018/0062830 A1* | 3/2018 | Baker | G06F 21/602 |
| 2018/0083769 A1* | 3/2018 | Maghrebi | H04L 9/002 |
| 2018/0097618 A1* | 4/2018 | Kumar | H04L 9/003 |
| 2018/0167196 A1* | 6/2018 | Cooper | G06F 21/72 |
| 2018/0183576 A1* | 6/2018 | Wang | H04L 9/0631 |
| 2018/0234233 A1* | 8/2018 | Knezevic | H04L 9/004 |
| 2018/0351729 A1* | 12/2018 | Tunstall | G06F 21/71 |
| 2019/0050204 A1* | 2/2019 | Hutter | H04L 9/30 |
| 2019/0349187 A1* | 11/2019 | do Canto | H04L 9/003 |
| 2020/0034573 A1* | 1/2020 | Pulkus | G06F 7/575 |
| 2020/0125333 A1* | 4/2020 | Vigilant | H04L 9/0631 |
| 2021/0028934 A1* | 1/2021 | Hamburg | H04L 9/3006 |
| 2021/0165633 A1* | 6/2021 | Guilley | G06F 7/501 |

* cited by examiner

Fig.1

Input: $m_{10} \in \{0; 2^n - 1\}$
Input: $m_{20} \in \{0; 2^n - 1\}$, so that $m_{20} \oplus m_{10} = 2^n - 1$
Input: $in_1 \in [0; 2^n[$
Input: $in_2 \in [0; 2^n[$
Output: $out \in [0; 2^n[$
$out = (m_{10} \wedge in_1) \oplus (m_{20} \wedge in_2)$
return $out$

Fig.2

Input: $m_{10}, m_{11}, m_{12} \in [0; 2^n[, \text{ so that } m_{10} \oplus m_{11} \oplus m_{12} \in \{0; 2^n - 1\}$
Input: $m_{20}, m_{21}, m_{22} \in [0; 2^n[, \text{ so that } m_{20} \oplus m_{21} \oplus m_{22} \in \{0; 2^n - 1\}$
Input: $in_1 \in [0; 2^n[$
Input: $in_2 \in [0; 2^n[$
Output: $out \in [0; 2^n[$ $out = (m_{10} \wedge in_1) \oplus (m_{11} \wedge in_1) \oplus (m_{12} \wedge in_1)$
$out = (m_{20} \wedge in_2) \oplus (m_{21} \wedge in_2) \oplus (m_{22} \wedge in_2) \oplus out$
return $out$

Fig.3

Input: $m_{10}, m_{11}, m_{12} \in [0; 2^n[$, so that $m_{10} \oplus m_{11} \oplus m_{12} \in \{0; 2^n - 1\}$ Input: $m_{20}, m_{21}, m_{22} \in [0; 2^n[$, so that $m_{20} \oplus m_{21} \oplus m_{22} \in \{0; 2^n - 1\}$ Input: $m_{30}, m_{31}, m_{32} \in [0; 2^n[$, so that $m_{30} \oplus m_{31} \oplus m_{32} \in \{0; 2^n - 1\}$ Input: $in_1 \in [0; 2^n[$ Input: $in_2 \in [0; 2^n[$ Input: $in_3 \in [0; 2^n[$ Output: $out \in [0; 2^n[$ $out = (m_{10} \wedge in_1) \oplus (m_{11} \wedge in_1) \oplus (m_{12} \wedge in_1)$ $out = (m_{20} \wedge in_2) \oplus (m_{21} \wedge in_2) \oplus (m_{22} \wedge in_2) \oplus out$ $out = (m_{30} \wedge in_3) \oplus (m_{31} \wedge in_3) \oplus (m_{32} \wedge in_3) \oplus out$ return $out$

Input: $i \in [0; 2^n[$

Input: $threshold \in [1; 2^n[$, so that $(i < 2 * threshold)$

Output: $m_{10}, m_{11}, m_{12} \in [0; 2^n[$, so that $m_{10} \oplus m_{11} \oplus m_{12} \in \{0; 2^n - 1\}$

Output: $m_{20}, m_{21}, m_{22} \in [0; 2^n[$, so that $m_{20} \oplus m_{21} \oplus m_{22} \in \{0; 2^n - 1\}$ $x = rand \in [0; 2^n[$ $r = rand \in [0; 2^n[$ $y = (x * threshold + i) / threshold$ $m_{10} = rand \in [0; 2^n[$ $m_{11} = x$ $m_{12} = (2 * x * y) - (2 * x * x) - x + (y - x - 1)$ $m_{11} = m_{11} \oplus r \oplus m_{10}$ $m_{12} = m_{12} \oplus r$ $m_{20} = m_{10} \oplus (2^n - 1)$ $m_{21} = m_{11} \oplus (2^n - 1)$ $m_{22} = m_{12} \oplus (2^n - 1)$ return $(m_{10}, m_{11}, m_{12}, m_{20}, m_{21}, m_{22})$

Fig.4

SIDE-CHANNEL HARDENED OPERATION

BACKGROUND

In computer security, a side-channel attack (see also, e.g., https://en.wikipedia.org/wiki/Side-channel_attack) is any attack based on information gained from the physical implementation of a computer system. Timing information, power consumption, electromagnetic leaks or even sound can provide an extra source of information, which can be exploited to break the system. Some side-channel attacks require technical knowledge of the internal operation of the system, although others such as differential power analysis are effective as black-box attacks. Many powerful side-channel attacks are based on statistical methods.

On security controllers, such as chipcard controllers, data need to be protected against side-channel analysis by malicious attackers. Generally, this can be done by implementing masking to protect security critical data while being processed.

But how to deal in case it comes to a decision that depends on secret data? This problem can, for instance, easily occur by having an if-then-else decision with a secret being involved in the condition. As no information about the secret should leak by observing the behavior of the microcontroller, special attention needs to be paid on the way how to deduce the result of this if-then-else sequence in a side-channel hardened manner.

In electronics, a multiplexer is a device that selects one of several inputs and forwards the selected input via an output. So, a multiplexer may refer to the same problem as an if-then-else code sequence.

SUMMARY

It is an objective to harden existing solutions, e.g., multiplexer or demultiplexer functions, against side-channel attacks and in particular to allow for a system (hardware and/or software) to become more robust against side-channel attacks.

In order to overcome this problem, a method is provided for conducting an operation comprising the following steps: determining a first result based on combining a first input with a first mask; determining a second result based on combining a second input with a second mask, wherein the first mask and the second mask fulfil a precondition; conducting the operation based on the first result and the second result.

The operation determines an output based on the inputs and the masks. The operation may comprise an XOR operation. Each mask may be AND-combined with its associated input. If a mask comprises several sub-masks, each input is being AND-combined with each of the sub-masks. Every AND-combination between input and mask (or sub-mask) may be regarded as a term and the multitude of such terms are XOR-combined with each other to obtain said output.

The precondition is a requirement for the masks (or the sub-masks) to fulfill. The precondition stipulates that only one of the several inputs are passed to the output. This corresponds to a multiplexer functionality that allows one out of many inputs to be conveyed to the output.

However, the inputs that are fed to the multiplexer are combined with the masks to efficiently hide the multiplexer mechanism by added (randomized) data. Hence, any side-channel attack is significantly impeded by the number of masks and operations introduced to the multiplexer mechanism.

According to an embodiment, the first result is determined by combining the first input with the first mask via an AND operation and wherein the second result is determined by combining the second input with the second mask via an AND operation.

Hence, an AND operation can be used to combine the mask with its respective input. If there are several sub-masks per input, each of the sub-mask is AND-combined with this input. The terms of AND combinations are XOR-combined to form the output.

It is an option that the terms of AND combinations are determined in an arbitrary, random, pseudo-random and/or interleaved order.

According to an embodiment, the operation comprises an XOR operation combining the first result and the second result.

For example, the first result and the second result are XOR-combined.

According to an embodiment, the operation comprises a multiplex operation allowing either the first input or the second input to pass, the precondition indicates that only one of the masks amounts to 1 . . . 1, thereby indicating which input to pass the multiplex operation.

Hence, the first mask may amount to 1 . . . 1 thereby allowing the first input to pass the multiplex operation and the second input not to pass the multiplex operation. Accordingly, the second mask may amount to 1 . . . 1 thereby allowing the second input to pass the multiplex operation and the first input not to pass the multiplex operation.

It is noted that "1" indicates a logical binary 1 and "0" indicates a logical binary 0. This enables an efficient masking (i.e. blocking or allowing values to pass) by using logic functions (e.g., logic gates).

According to an embodiment, the respective other mask amounts to 0.

Here, a mask amounting to 0 results in an output amounting to zero if the mask is AND combined with an input (because the output only results in logical 1 if both mask and input bit amount to 1). The AND operation can be flexibly used to ensure that the other inputs that are combined with a mask amounting to 0 are not passed to the output.

According to an embodiment, each mask comprises at least two sub-masks, wherein an XOR-combination of the sub-masks for each input are determined as follows:

$$m_{i0} \oplus \ldots \oplus m_{ik} \in \{0; 2^n-1\},$$

wherein
i. i indicates the number of the input,
ii. $m_{i0}$ to $m_{ik}$ indicates the k+1 sub-masks per input,
$\oplus$ indicates the XOR-operation,
i. $\{0; 2^n-1\}$ indicates that the term on the left-hand side may amount to either 0 or $2^n-1$ with n being the number of bits.

It is noted that $2^n-1$ (n being the number of bits) corresponds to 1 . . . 1 or 0xF . . . F (hexadecimal notation), i.e. each bit amounts to 1.

Hence, as several sub-masks are used for each of the inputs, at least one of the sub-masks may have an arbitrary value between 0 and $2^n-1$. Any arbitrary value may increase the arbitrary effect of the operation thereby providing an additional protection against side-channel attacks.

According to an embodiment, the precondition indicates that only one XOR-combination of sub-masks for one single input amounts to $2^n-1$, whereas the at least one remaining XOR-combination of sub-masks for the at least one other input amounts to 0.

This corresponds to the precondition in case each input is associated with several sub-masks, wherein only one XOR-combination of sub-masks amounts to 1 . . . 1 (or $2^n-1$ for n bit) and the remaining XOR-combinations of sub-masks amount to 0 . . . 0 (or 0 for all n bit). This ensures that only the input that is combined with the sub-masks that are XOR-combined to 1 . . . 1 is passed (e.g., as output of a multiplexer) and the other inputs are blocked.

According to an embodiment, one of the at least two sub-masks per input has a value in a range between 0 and $2^n-1$, wherein n denotes the number of bits.

This one sub-mask may be chosen randomly (pseudo-randomly, deterministically). It is noted that several sub-masks $m_{i0}$ to $m_{i(k-1)}$ may be chosen arbitrarily from a range between 0 and $2^n-1$, wherein at least one remaining sub-mask $m_{ik}$ of the sub-masks for one single input $in_i$ is determined such that the condition $m_{i0} \oplus \ldots \oplus m_{ik} \in \{0; 2^n-1\}$ is met.

According to an embodiment, the at least two sub-masks per input are determined based on at least one threshold, wherein the at least two sub-masks are determined depending on whether or not the input is larger than the threshold.

According to an embodiment, said method is used in an implementation of a cryptographic algorithm, in particular in a side-channel hardening solution.

For example, the method may be used in an AES or DES algorithm to provide additional benefits towards side-channel attacks.

According to an embodiment, wherein said method is implemented in hardware and/or software.

According to an embodiment, the method is used for operating a processing device, in particular one of the following: a FPGA; a processing unit; a controller; and a smartcard.

Also, a device is provided comprising a processing unit that is arranged such that the method as described herein is executable thereon.

According to an embodiment, the device is a security controller, comprises a security controller or is part of a security controller.

According to an embodiment, the device is a multiplexer or a demultiplexer.

A security controller may be a controller that is coupled to a chipcard or that is located on a chipcard.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

Further, a computer program product is suggested, which is directly loadable into a memory of a digital processing device, comprising software code portions for performing the steps of the method as described herein.

In addition, a computer readable medium is provided, which comprises program instructions, wherein the execution of the program instructions by at least one processor causes the at least one processor to carry out the steps of the method as described herein.

The computer readable medium may be a storage of any kind, having computer-executable instructions adapted to cause a computer system to perform the method as described herein.

Furthermore, the problem stated above is solved by a communication system comprising at least one device as described herein.

Also, an electronic control unit is provided comprising or being coupled with the device as described herein.

A vehicle is suggested, which comprises at least one device as described herein.

Also an apparatus is provided for conducting an operation, said apparatus comprising: means for determining a first result based on combining a first input with a first mask; means for determining a second result based on combining a second input with a second mask, wherein the first mask and the second mask fulfil a precondition; means for conducting the operation based on the first result and the second result.

BRIEF DESCRIPTION OF THE FIGURES

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

FIG. 1 shows an example of a basic algorithm, which returns an input $in_1$ in case an input mask $m_{10}$ amounts to 1 . . . 1 and an input mask $m_{20}$ amounts to 0 or an input $in_2$ in case the input mask $m_{10}$ amounts to 0 and the input mask $m_{20}$ amounts to 1 . . . 1.

FIG. 2 shows an example of an algorithm using three masks and two input values.

FIG. 3 shows an example of an algorithm using three masks on three input values.

FIG. 4 shows an algorithm generating three masks for two input values.

DETAILED DESCRIPTION

Figure 5:
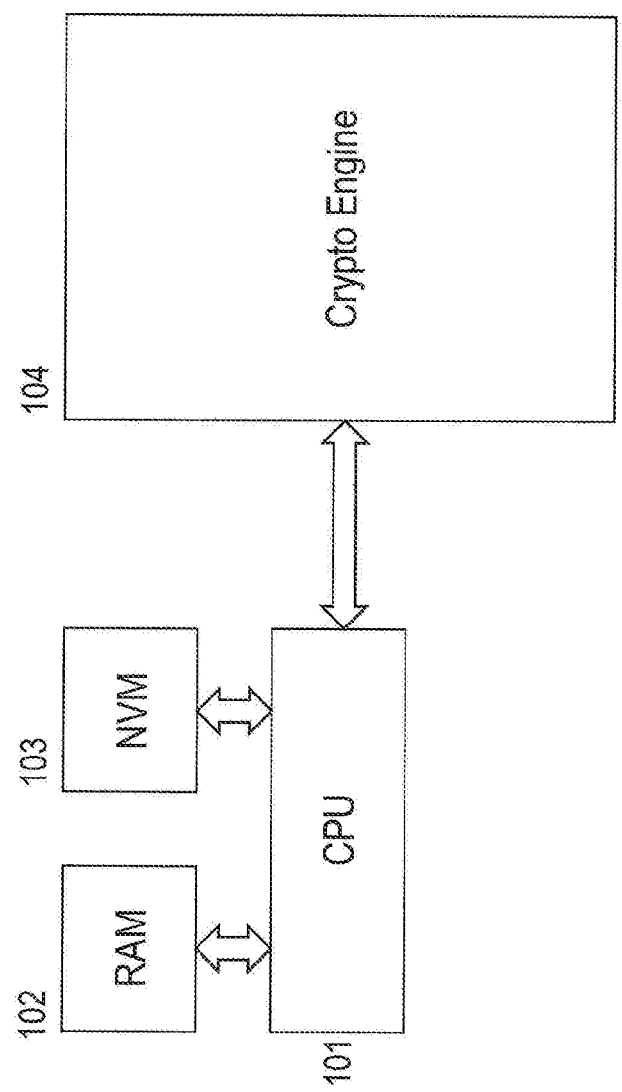
FIG. 5 shows an exemplary system comprising units that utilize the approach described herein.

Examples described herein may in particular be utilized for a multiplexer having several input signals. Advantageously, the solution presented provides a side-channel hardened implementation for such multiplexer.

Embodiments described herein solve the problem by calculating random-looking bit-wise AND-masks and applying them to input values.

An exclusive-or operation (XOR-operation, ED) is true (logical 1) in case the inputs differ, and it is false (logical 0) in case the inputs are identical.

It is noted that the XOR-operation and other logic operations described herein serve as examples. Other logic gates and/or circuitry may be used to implement the functionality as described herein.

The number of inputs as well as the number of masks may vary so the algorithm suggested herein may be extended.

FIG. 1 shows an example of a basic algorithm, which returns an input $in_1$ in case the input mask $m_{10}=2^n-1$, i.e. if and only if an input mask $m_{20}=0$ or vice versa.

In this example, there exists the precondition that one mask is zero while the other mask amounts to $2^n-1$, i.e. 0xF . . . F (indicating a series of binary ones, i.e. "1 . . . 1").

Hence, in the example shown in FIG. 1 there exist the following possibilities:

| Mask $m_{10}$ | Mask $m_{20}$ | Output out |
|---|---|---|
| 0 | 1 ... 1 | $in_2$ |
| 1 ... 1 | 0 | $in_1$ |

As the two masks $m_{10}$ and $m_{20}$ in this example are somewhat lacking a random-character (each mask is chosen from either 0 or 1 ... 1), more than a single mask may be applied for each input $in_i$. In this case, the masks per input may also be referred to as sub-masks.

When using two masks $m_{i0}$, $m_{i1}$ for each input $in_i$, the mask $m_{10}$ can be any value in a range between 0 and $2^n-1$, i.e. $[0;2^n]$. However, the mask $m_{10}$ and the mask $m_{i1}$ are not independent from each other, i.e. the XOR-combination of the masks amount to "1 ... 1".

In the examples below, three masks $m_{i0}$, $m_{i1}$, $m_{i2}$ are used for each input $in_i$. This allows generating random masks $m_{ik}$ such that applying a bit-wise XOR-operation on the three masks fulfills the requirement of the result of this XOR-operation amounting to "1 ... 1". In addition, bitwise AND-operations (indicated by the symbol "∧") between each of the masks and the input $in_i$ provide an improved randomization of the power profile compared to the embodiment shown in FIG. 1.

It is noted that the term random value used throughout this document may refer to a true random, pseudo-random or deterministically obtained value, which has some sort of randomness or random effect. For example, if a number is taken from a memory, this number may not have to be a true random value, but unless an attacker is neither aware of the memory nor of the algorithm it adds a significant amount of randomness. In other words, the term "random" as used herein may not be restricted to any true randomness, but it also extends to any strong or even weak arbitrary effect that is exploited by using additional values.

The precondition mentioned above may thus be extended as follows:

Three masks $m_{10}$, $m_{11}$, $m_{12}$ are applied on the input $in_1$; the three masks are combined via an XOR-operation, wherein the result of this XOR-operation amounts to either zero or $2^n-1$, i.e., $m_{10} \oplus m_{11} \oplus m_{12} \in \{0; 2^n-1\}$.

For example, the XOR-combination of the masks $m_{i0} \oplus m_{i1} \oplus m_{i2}$ can be $2^n-1$ ("1 ... 1") for a single input value $in_i$, while the XOR-combination of the masks $m_{j0} \oplus m_{j1} \oplus m_{j2}$ then need to be zero for all j that are different from i. The input value is than the result of the multiplexer while the other input values $in_j$ (j being different from i) have no effect on the output.

This results in an algorithm according to FIG. 2, which uses three masks for each input. It is noted that only one of the input is conveyed to the output to implement the multiplexer functionality; hence only one set of masks (either the set comprising the masks $m_{10}$, $m_{11}$, $m_{12}$ or the set of masks $m_{20}$, $m_{21}$, $m_{22}$) can be XOR-combined such that the result amounts to "1 ... 1".

It is noted that a mask $m_{ik}$ may have any value in a range from 0 to $2^n-1$, i.e., $[0;2^n]$.

This approach may be extended to three and more input values by providing more masks while maintaining the preconditions as stated above.

FIG. 3 shows an algorithm using three masks on three input values.

As indicated above, while maintaining the overall precondition, the values of the individual masks may be chosen more flexibly, in particular more randomly. Three masks provide the possibility for two masks to be chosen randomly from a value between 0 and $2^n-1$.

It is noted that the calculation of the output out, in particular the order of the $(m_{ik} \wedge in_i)$ terms may be randomized or determined in an interleaved manner (i.e. not sorted by the value of or by the value of i) to even further improve the side-channel robustness.

As an option, pre-defined masks may be used. However, masks can be generated for various purposes. Also, such generation of masks can be hardened against side-channel attacks.

In an exemplary scenario, an implementation of a multiplexer has three input values $in_1$, $in_2$ and $in_3$, wherein only one of the input values should be selected as an output out. The algorithm of FIG. 3 suggests using three masks $m_{i0}$, $m_{i1}$, $m_{i2}$, with i★{0; 1; 2}, which are applied on the inputs $in_1$, $in_2$ and $in_3$ such that the output out shows a randomized power profile and wherein the output out only comprises the information of only one of the inputs $in_1$, $in_2$ and $in_3$. Also, the subsequent approach of determining the output out is shown.

FIG. 4 shows an algorithm generating three masks for two input values.

For i<threshold, the algorithm leads to $$m_{10} \oplus m_{11} \oplus m_{12} = 2^n-1$$

and $$m_{20} \oplus m_{21} \oplus m_{22} = 0.$$

For i≥threshold, the effect of the masks is interchanged and therefore the other input value is provided as output by a subsequent execution of the algorithm shown in FIG. 3.

The change in masks is based on the fact that for i<threshold the value of x and the value of y are the same and differ afterwards by one. To restrict the difference to be at most 1 the precondition i<2·threshold needs to be considered.

In a software implementation this restriction may be implemented by setting the highest bit of both values when generating the masks.

As an option, the deduction of masks may be implemented using masks with an increased degree of randomness.

In the example shown in FIG. 4, the masks $m_{20}$, $m_{21}$, $m_{22}$ are the inverted values of the masks $m_{10}$, $m_{11}$, $m_{12}$.

It is an option that the masks $m_{20}$, $m_{21}$ and $m_{22}$ are determined as follows:

$$m_{20} = m_{10} \oplus r_1,$$

$$m_{21} = m_{11} \oplus r_2,$$

$$m_{22} = m_{12} \oplus r_3,$$

wherein $$r_1 \oplus r_2 \oplus r_3 = 1 \ldots 1$$

and wherein r1, r2 and r3 are arbitrary numbers each taken from the interval $[0;2^n]$.

Exemplary System or Device

FIG. 5 shows a central processing unit 101 that is coupled with a random access memory 102 and a non-volatile memory 103. The central processing unit 101 is further coupled with a crypto engine 104, e.g., a crypto-coprocessor.

The approach described herein may in particular run on the central processing unit 101 to increase the safety and/or the security of the multiplexing (or demultiplexing) operation.

Further Advantages and Aspects

Hence, the solutions described herein in particular deduce random masks and provide these masks together with the input data to a multiplexer to hide the multiplexer-mechanism by the operations based on the masks (which to the outside, e.g., a side-channel attack, appears to be arbitrary).

The algorithms described herein may be implemented in hardware and/or software. Any programming language can be used to implement these algorithms. Also, the operations can—at least partially—be implemented as a circuitry providing functional blocks of an arithmetic unit.

Also, other use cases may utilize an extended number of input values and/or an increased number of masks per input value.

Advantageously, the embodiments presented provide mechanisms on how to improve a side-channel robustness of a core task when dealing with decisions based on secret values. As these decisions need to be hardened against side-channel attacks the examples provide a mechanism for hiding the decision in the normal code flow.

The mechanisms may be implemented such that they do not affect any functional behavior of a customer system, but at the same time significantly improve the robustness of the customer system against side-channel attacks.

The solution described may be used wherever a multiplexer or demultiplexer is applicable. Depending on the use case, a specific combination of number of input values together with the number of masks can be applied. It may also be used for side-channel hardened demultiplexers.

The examples presented may in particular be part of an implementation of the AES or DES algorithm providing advanced side-channel protection. It is also an option combining the solution described herein with dummy calculations, i.e. calculations that are conducted for the sole purpose of producing dummy (i.e. additional useless) information for a side-channel attacker.

The solution described herein may be used in automotive applications, in particular in vehicles. Advantageously, embodiments of the approach described herein may be applied to increase the redundancy and thus the safety in systems without the need for a duplicated hardware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method for conducting an operation, the method comprising:
    determining a first result based on combining a first input with a first mask,
    determining a second result based on combining a second input with a second mask, the first mask and the second mask fulfilling a precondition; and
    conducting the operation based on the first result and the second result, wherein the operation comprises a multiplex operation allowing either the first input or the second input to pass, and wherein the precondition indicates that only one of the masks amounts to 1 . . . 1, thereby indicating which input to pass the multiplex operation; and
    wherein the method is implemented in a digital processing environment to reduce susceptibility of the operation to monitoring via side-channel attacks.

2. The method of claim 1, wherein the first result is determined by combining the first input with the first mask via an AND operation, and wherein the second result is determined by combining the second input with the second mask via an AND operation.

3. The method of claim 1, wherein the operation comprises an XOR operation combining the first result and the second result.

4. The method of claim 1, wherein the respective other mask amounts to 0.

5. The method of claim 1, wherein each mask comprises at least two sub-masks, wherein an XOR-combination of the at least two sub-masks for each input are determined as follows:

$$m_{i0} \oplus \ldots \oplus m_{ik} \in \{0; 2^n - 1\},$$

and wherein
    i indicates the number of the input,
    $m_{i0}$ to $m_{ik}$ indicates the k+1 sub-masks per input,
    $\oplus$ indicates the XOR-operation,
    $\{0; 2^n - 1\}$ indicates that the term on the left-hand side may amount to either 0 or $2^n - 1$ with n being the number of bits.

6. The method of claim 5, wherein the precondition indicates that only one XOR-combination of the at least sub-masks for one single input amounts to $2^n - 1$, and wherein the at least one remaining XOR-combination of the at least sub-masks for the at least one other input amounts to 0.

7. The method of claim 5, wherein one of the at least two sub-masks per input has a value in a range between 0 and $2^n - 1$, and wherein n denotes a number of bits.

8. The method of claim 7, wherein the at least two sub-masks per input are determined based on at least one threshold, and wherein the at least two sub-masks are determined depending on whether or not the input is larger than the threshold.

9. The method of claim 1, wherein the method is used in an implementation of a side-channel hardening cryptographic algorithm.

10. The method of claim 1, wherein the method is implemented with digital hardware and/or with software executing in a processor.

11. The method of claim 1, wherein the method is used for operating an FPGA, a processing unit, a controller, or a smartcard.

12. A device comprising processing circuitry configured to reduce susceptibility of an operation to monitoring via side-channel attacks, by:
    determining a first result based on combining a first input with a first mask, determining a second result based on combining a second input with a second mask, the first mask and the second mask fulfilling a precondition; and conducting the operation based on the first result and the second result, wherein the operation comprises a multiplex operation allowing either the first input or the second input to pass, and wherein the precondition indicates that only one of the masks amounts to 1 . . . 1, thereby indicating which input to pass the multiplex operation.

13. The device of claim 12, wherein the device is a security controller, comprises a security controller or is part of a security controller.

14. The device of claim 12, wherein the device is a multiplexer or a demultiplexer.

15. An electronic control unit comprising or being coupled with the device of claim 12.

16. A vehicle comprising the device of claim 12.

17. A non-transitory computer readable medium comprising, stored thereupon, program instructions, wherein the program instructions are configured so that execution of the program instructions by at least one processor causes the at least one processor to reduce susceptibility of the operation to monitoring via side-channel attacks, by:

determining a first result based on combining a first input with a first mask, determining a second result based on combining a second input with a second mask, the first mask and the second mask fulfilling a precondition; and conducting the operation based on the first result and the second result, wherein the operation comprises a multiplex operation allowing either the first input or the second input to pass, and wherein the precondition indicates that only one of the masks amounts to 1 . . . 1, thereby indicating which input to pass the multiplex operation.

* * * * *